UNITED STATES PATENT OFFICE.

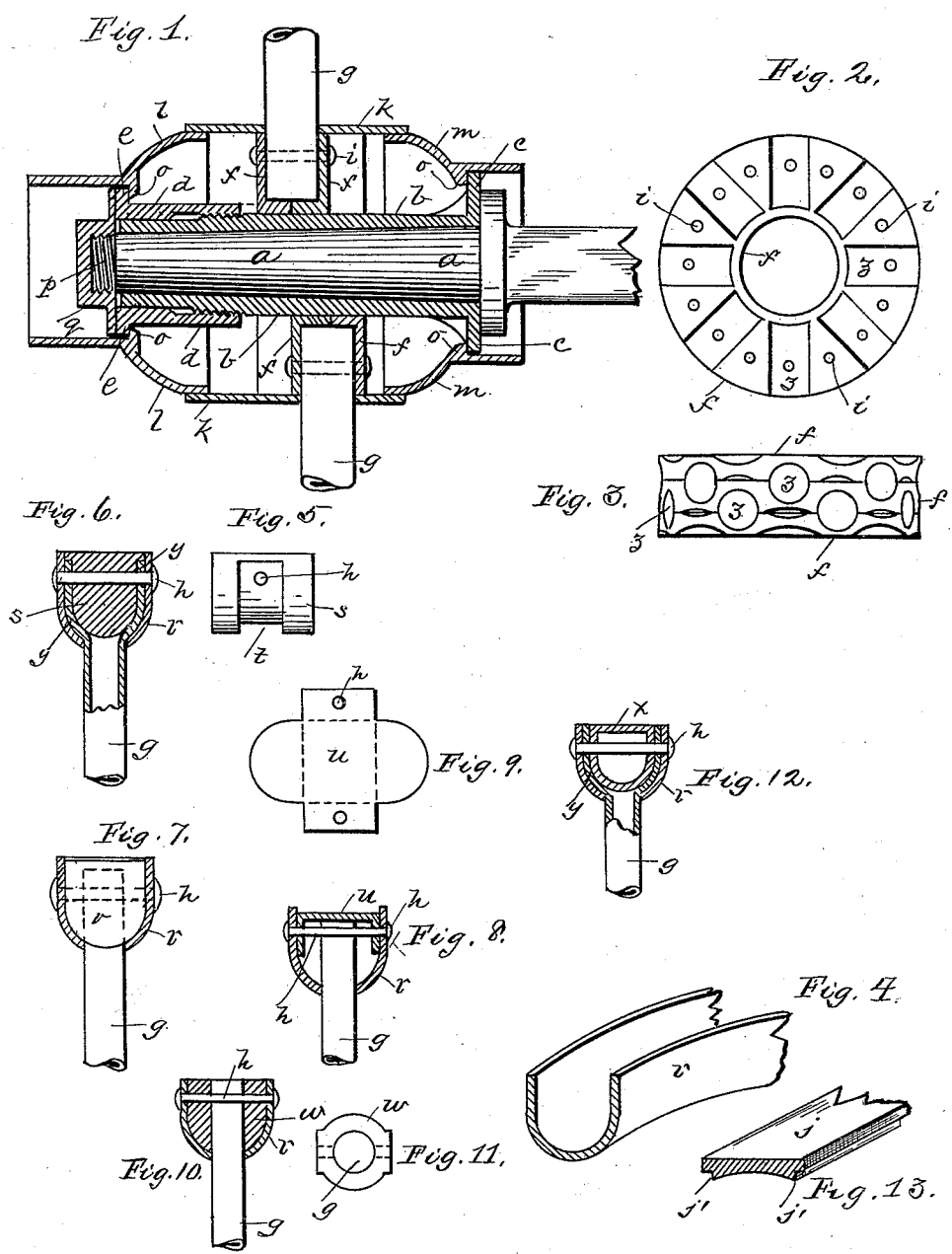

JOHN B. LOTT, OF KITTANNING, PENNSYLVANIA.

VEHICLE-WHEEL.

SPECIFICATION forming part of Letters Patent No. 405,424, dated June 18, 1889.

Application filed April 2, 1889. Serial No. 305,747. (No model.)

*To all whom it may concern:*

Be it known that I, JOHN B. LOTT, a citizen of the United States, residing at Kittanning, in the county of Armstrong and State of Pennsylvania, have invented certain new and useful Improvements in Vehicle-Wheels; and I do hereby declare the following to be a full, clear, and exact description of the invention, such as will enable others skilled in the art to which it pertains to make and use the same, reference being had to the accompanying drawings, which form a part of this specification.

My invention relates to an improved vehicle wheel and hub; and it consists in a metallic hub of peculiar construction fitted with tubular spokes, and also of a metallic felly, and a means of attaching the spokes thereto, together with certain other details of construction and combination of parts, as will be fully described hereinafter.

In the accompanying drawings, Figure 1 is a side sectional elevation of my improved vehicle-hub constructed in accordance with my invention. Fig. 2 is a face view of one of the corrugated disks used for securing the base of the spokes in position. Fig. 3 is a plan view of the corrugated disks. Fig. 4 is a perspective view of a portion of my improved metallic felly. Figs. 5 and 6 are detailed views showing the manner of attaching the outer ends of the spokes to the felly. Fig. 7 is a modification for the same purpose. Fig. 8 is another modification, in which a bent plate is used. Fig. 9 is a plan view of the plate before bending. Figs. 10 and 11 are a sectional elevation and plan view of another means for securing the spokes to the felly. Fig. 12 is a sectional elevation of another device for attaching the spokes to the felly. Fig. 13 is a perspective view of the tire used on my improved felly.

To put my invention into practice with a spindle $a$ of ordinary construction and such as are now in common use, I provide an annular box $b$ of suitable size and form, having integral therewith an outwardly-projecting flange $c$. Over the forward end of this box $b$ is a neatly-fitting sleeve $d$, provided at its forward end with a screw-thread, which engages with a threaded portion of the box $b$ and locks the two rigidly together. This sleeve $d$ is also provided with a flange $e$, located at the front of the same. Surrounding the axle-box $b$ are three corrugated plates $f$, which serve to retain the inner ends of the spokes $g$ in position. These spokes $g$, I construct of suitable-sized tubing, and lock the same between the plates $f$ by means of a bolt or rivet $h$, passed transversely through the said plates $f$ and the spokes $g$. Before placing the spokes in position the plates $f$ are placed within an annular ring $k$, provided with small circular openings arranged over each of the openings $z$ in the plates $f$. At each side of this annular ring $k$, and fitted within the same, are two light metallic sleeves $l$ $m$, each of which is provided on its inner surface with a bead $o$, which has a bearing against the flange $c$ on the box $b$ and against the flange $e$ on the inner sleeve $d$. At the front end of the spindle $a$ is formed a reduced threaded portion $p$, on which is placed a flanged nut $q$, which attaches the hub to the axle $a$. The spokes $g$ may be dished in any desired manner, or may be placed in the same vertical plane.

At Fig. 4 on the drawings I have shown a portion of my improved felly $r$, such as I prefer to use in connection with tubular spokes $g$, and it consists in a U-shaped metallic band extending about the entire wheel and provided on its inner side with circular openings, through which the outer extremities of the spokes $g$ project. These spokes $g$ at their extremities are split or divided and separated in the channel and a wedge-shaped piece $s$ inserted and held in position by a small bolt or rivet $h$. A semicircular groove $t$ formed about the base of these pieces $s$ (see Fig. 5) serves to admit the divided ends $y$ of the spokes $g$, and the piece $s$ acts as a brace to the felly $r$.

I have shown on the drawings various other devices for attaching the spokes to the felly—some for the purpose of strength and others for the purpose of reducing the weight of the finished wheel. At Figs. 8 and 9 is shown a metallic plate $u$ bent and fitted into the felly $r$ and attached thereto by a rivet $h$. At Fig. 7 a cap $v$ is fitted over the end of the spoke $g$, and the whole held in position by a rivet $h$. At Fig. 10 will be seen a slight modification of Fig. 7. Fig. 12 shows the divided end $y$ of the spoke $g$ and a hollow wedge $x$ attached in position by a rivet $h$.

At Fig. 13 of the drawings $j$ designates the tire, which is provided at its edges on the lower face thereof with longitudinal grooves $j'$, in which are received the edges of the U-shaped felly when the tire is properly adjusted thereon.

Having thus described my invention, what I claim, and desire to secure by Letters Patent, is—

1. The combination of a U-shaped felly, a spoke passing through the same, a wedge or cap shaped piece fitted within the felly on a plane below the edges thereof, a rivet which unites the felly, spoke, and cap-shaped piece together, and a tire having the recesses or grooves in its edges which receive the edges of the tire, all arranged and combined substantially as described.

2. The combination of a U-shaped felly, a spoke having a longitudinally-divided end passing through the felly, and a fixed piece fitted between the divided ends of the spoke within the felly, substantially as described.

3. In combination with the felly $r$, the tubular spokes $g$, projecting into the same, the wedge-shaped piece $s$, and divided end $y$ of the spoke $g$, and the bolt or rivet $h$, as and for the purpose described.

In testimony that I claim the foregoing I hereunto affix my signature this 29th day of March, A. D. 1889.

JOHN B. LOTT. [L. S.]

In presence of—
　M. E. HARRISON,
　JOHN C. THOMPSON.